(12) United States Patent
Avery et al.

(10) Patent No.: US 10,936,671 B2
(45) Date of Patent: Mar. 2, 2021

(54) LINKED RECORD DECLARATION OF RELATED CONTENT ITEMS

(71) Applicant: International Business Machines Corporation, Armonk, NY (US)

(72) Inventors: Kenytt D. Avery, Newport Beach, CA (US); Edward L. Bader, Los Angeles, CA (US); Jean-Marc Costecalde, Irvine, CA (US); Chi M. Nguyen, Irvine, CA (US)

(73) Assignee: International Business Machines Corporation, Armonk, NY (US)

( * ) Notice: Subject to any disclaimer, the term of this patent is extended or adjusted under 35 U.S.C. 154(b) by 625 days.

(21) Appl. No.: 15/638,234

(22) Filed: Jun. 29, 2017

(65) Prior Publication Data

US 2019/0005033 A1    Jan. 3, 2019

(51) Int. Cl.
*G06F 16/901* (2019.01)
*G06F 16/93* (2019.01)
*G06F 16/35* (2019.01)
*G06F 16/22* (2019.01)

(52) U.S. Cl.
CPC .......... *G06F 16/93* (2019.01); *G06F 16/2246* (2019.01); *G06F 16/35* (2019.01); *G06F 16/9024* (2019.01)

(58) Field of Classification Search
CPC .. G06F 16/122; G06F 16/907; G06F 16/2246; G06F 16/9024
USPC .......................................... 707/694, 798, 822
See application file for complete search history.

(56) References Cited

U.S. PATENT DOCUMENTS

| | | | |
|---|---|---|---|
| 2010/0082548 A1* | 4/2010 | Crockett | G06F 16/125 707/662 |
| 2011/0016134 A1 | 1/2011 | Craswell et al. | |
| 2011/0131185 A1* | 6/2011 | Kirshenbaum | G06F 11/1448 707/654 |
| 2012/0005242 A1 | 1/2012 | Feng et al. | |
| 2016/0277250 A1* | 9/2016 | Maes | H04L 41/0896 |

OTHER PUBLICATIONS

IBM, "Version Management for Multi-part Documents Using IBM Content Manager", Nov. 17, 2006, ip.com No. IPCOM000143240D, can be retrieved from the Internet at <URL: http://ip.com/IPCOM/000143240>, Total 3 pp.

(Continued)

*Primary Examiner* — Marcin R Filipczyk
(74) *Attorney, Agent, or Firm* — Konrad Raynes Davda & Victor LLP; Janaki K. Davda (57) ABSTRACT

Provided are techniques for linked record declaration of related content items. A graph of nodes representing content items is generated with edges connecting the nodes and representing relationships between the content items. A content item represented by a node in the graph of nodes is selected. In response to selection of the content item, the edges of the graph of nodes are traversed starting from the selected content item to identify other content items. A record is declared in a records management system for the selected content item and the identified content items. A lifecycle policy is associated with the record. The lifecycle policy is applied to the selected content item and the identified content items when processing the record.

15 Claims, 8 Drawing Sheets

(56) References Cited

OTHER PUBLICATIONS

Mell, P. and T. Grance, "The NIST Definition of Cloud Computing (Draft)", Sep. 2011, Computer Security Division Information Technology Laboratory National Institute of Standards and Technology, Total 7 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

\* cited by examiner

LINKED RECORD DECLARATION OF RELATED CONTENT ITEMS

BACKGROUND

Embodiments of the invention relate to linked record declaration of related content items (e.g., documents).

In a records management system, when a document is to be managed as a record, each document is declared as a record independently. The record is stored in a category of a file plan. Unlike the records management system, a database stores data in rows of tables.

However, there are times where documents are related to each other. For example, a text document may have different rendered versions in different formats (e.g., Hypertext Markup Language (HTML), Portable Data Format (PDF), etc.) which may be placed in different locations for different purposes. However, currently, each of these different renditions may have a separate record and so are deleted separately. Conventional solutions require manual intervention. That is, the user has to know what document is linked to what other document. There are also as many records as documents linked together, making the record management system overwhelmed by records that all follow the same lifecycle policy.

One solution is to create a compound document (a single document that contains multiple content elements, such as the text document and the different rendered versions) and declare that one document as a record. But that solution makes it difficult to publish the rendered versions to different locations. For example, the text document may be kept in a secure location where it can only be updated by a limited number of people, but the PDF rendered version may be stored in other locations for anyone to read.

Another solution is to link the main document to its rendered version using links with a cascading deletion feature. For example, when a link is created between the main document (e.g., a text document) and a rendered version (e.g., a PDF version of the text document), the link may be specified to be cascading deletion. Then, when the main document is deleted, the link is followed to the rendered version, and the rendered version is deleted automatically. Each of the linked documents (e.g., the main document and the rendered version) may also have links to other documents with a cascading deletion feature. However, this is a workaround that does not provide records management to the linked documents. For example, only the main (parent) document is managed as a record (e.g., deleted in accordance with a lifecycle policy). A solution like this may not be U.S. Department of Defense (DoD) compliant and may still require all documents (e.g., the main document and the rendered version) to be declared independently in order to be locked down (i.e., not deleted and/or not edited) and managed properly by the records management system.

Moreover, some links may only exist as references. For example, an HTML page can point to image files. In that case, a cascading deletion is not possible without additional links added for that purpose.

SUMMARY

Provided is a method for linked record declaration of related content items. The method comprises generating, using a processor of a computer, a graph of nodes representing content items with edges connecting the nodes and representing relationships between the content items; selecting a content item represented by a node in the graph of nodes; and, in response to selection of the content item, traversing the edges of the graph of nodes starting from the selected content item to identify other content items, declaring a record in a records management system for the selected content item and the identified content items, associating a lifecycle policy with the record, and applying the lifecycle policy to the selected content item and the identified content items when processing the record.

Provided is a computer program product for linked record declaration of related content items. The computer program product comprises a computer readable storage medium having program code embodied therewith, the program code executable by at least one processor to perform: generating a graph of nodes representing content items with edges connecting the nodes and representing relationships between the content items; selecting a content item represented by a node in the graph of nodes; and, in response to selection of the content item, traversing the edges of the graph of nodes starting from the selected content item to identify other content items, declaring a record in a records management system for the selected content item and the identified content items, associating a lifecycle policy with the record, and applying the lifecycle policy to the selected content item and the identified content items when processing the record.

Provided is a computer system linked record declaration of related content items. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: generating a graph of nodes representing content items with edges connecting the nodes and representing relationships between the content items; selecting a content item represented by a node in the graph of nodes; and, in response to selection of the content item, traversing the edges of the graph of nodes starting from the selected content item to identify other content items, declaring a record in a records management system for the selected content item and the identified content items, associating a lifecycle policy with the record, and applying the lifecycle policy to the selected content item and the identified content items when processing the record.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
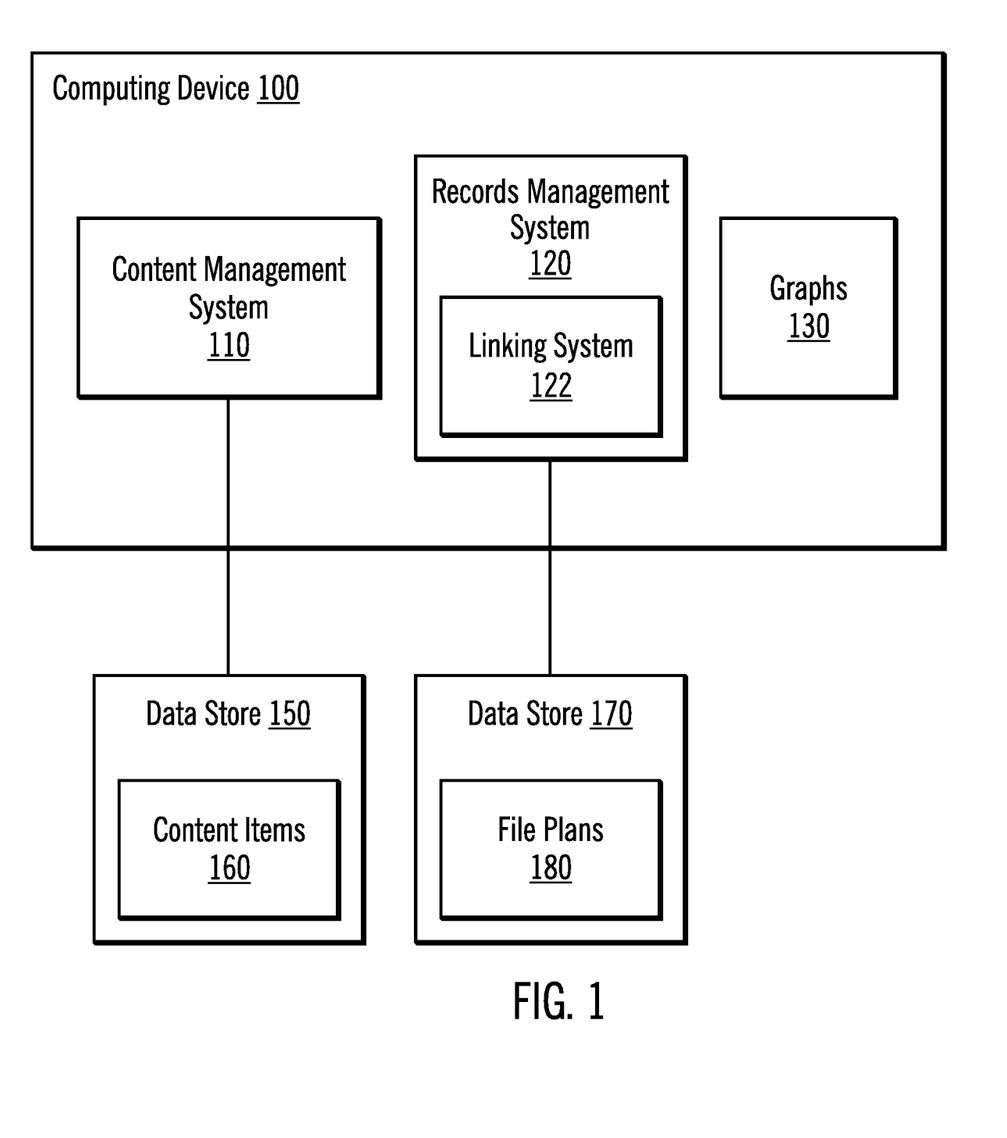
FIG. 1 illustrates, in a block diagram, a computing environment in accordance with certain embodiments.

FIG. 1 illustrates, in a block diagram, a computing environment in accordance with certain embodiments. A computing device 100 includes a content management system 110 and a records management system 120. The records management system 120 includes a linking system 122, which generates graphs 130 of related content items. The computing device 100 is coupled to data store 150 and to data store 170. The content management system 110 manages content items 160 (e.g., documents and rendered versions) in the data store 150. The records management system 120 manages file plans 180 in the data store 170.

Figure 2:
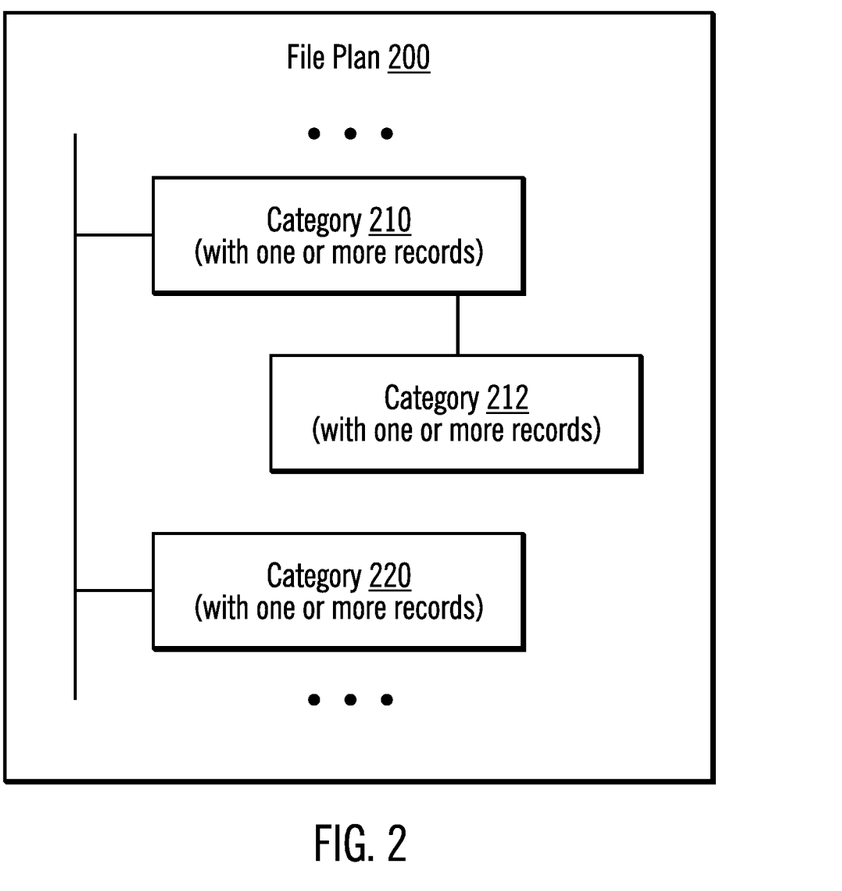
FIG. 2 illustrates, in a block diagram, an example file plan in accordance with certain embodiments.

FIG. 2 illustrates, in a block diagram, an example file plan 200 in accordance with certain embodiments. The file plan 200 includes categories, such as categories 210, 212, 220. The ellipses indicate that there may be other categories. The categories may have a hierarchical structure. For example, category 212 is a child of parent category 210. Each of the categories 210, 212, 220 stores one or more records. Each of the records describes one or more content items. Each of the categories is associated with a lifecycle policy, which indicates how long records in that category are to be retained and when records in that category may be destroyed. A lifecycle policy may be referred to as a records management lifecycle policy.

In an embodiment, records may be put on hold. A record on hold is not destroyed until the hold is removed. Certain records may be selected to be put on hold based on functionality (e.g., all records related to a particular litigation case or particular insurance policy, etc.). Also, there may be records on hold in different categories.

In an embodiment, a record has metadata. In an embodiment, a document and a record for that document may either be two different entities (in which case the record points to the document) or the metadata of the record is added to the document itself. In an embodiment, a record may point multiple documents.

The linking system 122 declares a set of linked content items as a single record. For any content item linked to another content item, the linking system 122 automatically associates the each linked content item to the same record in the same category of a file plan and follows the same lifecycle policy for each linked content item, avoiding the need to declare each content item as a separate record.

By declaring a linked set of content items as a record, the linking system 122 automatically declares all the content items linked together as a single record. If a new content item is added as a link, the linking system 122 automatically adds the new content item to the same record as other linked content items.

In an embodiment, when a content item is deleted, the linking system 122 also deletes the different rendered versions of that content item by using the record to identify the different rendered versions, which are linked content items.

The linking system 122 provides automatic discovery of the links between content items. In an embodiment, the linking system provides a discovery mechanism to find related content items through links defined within the content items. In an embodiment, the links may be represented with content items with a head and a tail pointing from one content item to another, in which case, the linking system 122 follows the links to create a graph of content items. With other embodiments, the links may be internal references between content items (e.g., an HTML page pointing to an image in an attribute of an <img> tag). As another example, if an HTML page uses an image with a href tag, then the linking system adds that image into the collection of linked content items for the HTML page. Also, if a new content item is added that belongs to that linkage, then the linking system 120 automatically adds the new content item to the record without manual intervention. Thus, in an embodiment, a content item includes metadata that identifies other, related content items and relationships to those content items (e.g., a copy is stored in X, a Portable Data Format (PDF) version is stored in Y, an updated version is stored in Z, etc.).

In an embodiment, the linking system 122 follows links within the content items to identify relationships between content items. Then, the linking system 122 generates a graph by representing the content items with nodes and by representing the relationships between content items with edges.

In an embodiment, the linking system 122 excludes some types of links for identifying linked content items for record declaration. Thus, some related content items may be excluded from the graph. For example, if there is a superseding/superseded relationship between two content items, the older and newer version of the content item may follow different retention schedules, and therefore shouldn't be associated to the same record.

In an embodiment, the linking system 122 also ignores a link referring to a copy of a content item. If a content is copied and a link is created to reference the original content item, each of the two content items may follow different retention schedules, and so are declared as separate records.

Embodiments provide an exclude mechanism or an include mechanism. For the exclude mechanism, the linking system provides a list of links and/or link types from a list of all links and receives user input to remove one or more links in the list. For example, with an exclude mechanism, a user may indicate that links to PDF documents are to be ignored so that PDF documents are not identified as linked content items. With the include mechanism, the linking system 122 provides a list of links and/or link types from a list of all links and receives user input to include one or more links in the list. For example, with an include mechanism, a user may indicate that links to HTML pages are to be included so that the HTML pages are identified as linked content items.

In order to perform record declaration, the linking system 122 generates a graph for a group of related content items. In certain embodiments, the graph is an undirected graph. The graph includes nodes that represent content items and edges between the nodes that represent relationships of the content items.

In an embodiment, the linking system 122 may select one of the edges or one of the nodes as a starting point, and declare that selected item as a record. With additional embodiments, a user may select one of the edges or one of the nodes. The linking system 122 then traverses the edges of the graph (from the selected starting point) to find the content items that are linked together and associates them to a new, single record. In certain embodiments, the linking system 122 adds all of the content items in the graph to the record.

That new, single record is also associated with a lifecycle policy and follows records management procedures for processing the lifecycle policy. The lifecycle policy is defined by the category in which the record is stored. For example, if the record is stored in a category that says: "keeps for 10 years and then destroy", that will become the record lifecycle policy.

Additionally, the linking system 122 displays (e.g., on a computer screen) records. In response to receiving selection of a record (e.g., from a user), the linking system 122 displays the graph of linked content items associated with that record. For example, the user is presented with the graph of linked content items, not just a single content item associated with a record. In an embodiment, the linking system 122 displays content items. In response to receiving selection of a content item, the linking system 122 provides the associated record. Then, selection of the record results in the graph being displayed. In an embodiment, in response to receiving selection of a content item, the linking system 122 provides the graph.

Moreover, the linking system 122 automatically adds any new content item linked to the existing content items to the same record by automatic discovery of the related content items, which may be performed periodically.

Figure 3:
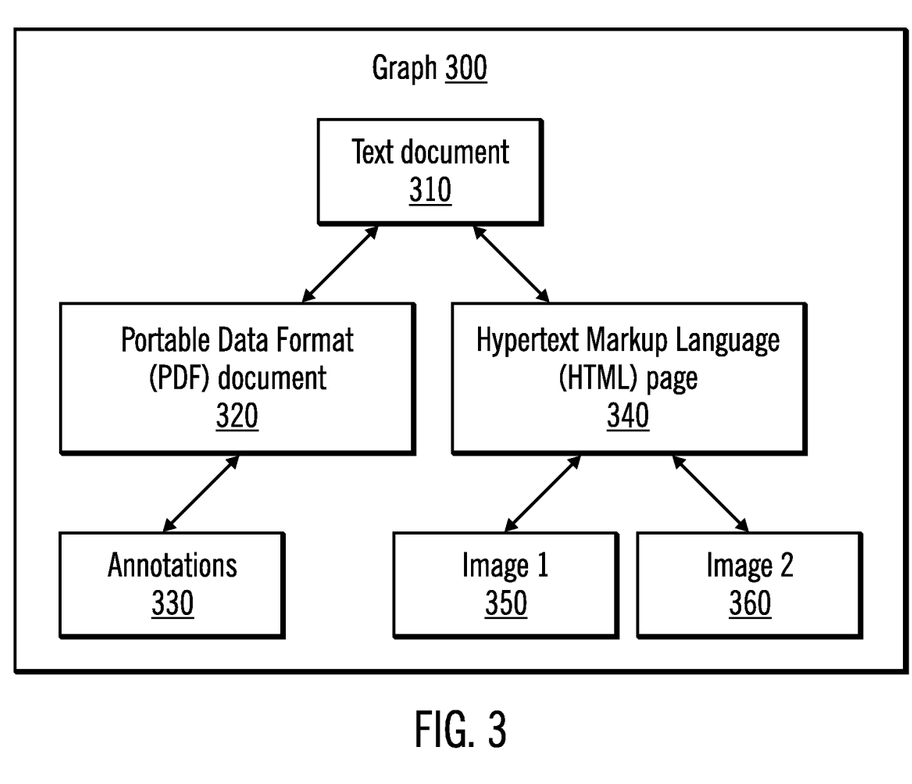
FIG. 3 illustrates, in a block diagram, a graph, in accordance with certain embodiments.

FIG. 3 illustrates, in a block diagram, a graph 300, in accordance with certain embodiments. In the graph 300, there is a text document 310. The text document 310 is related (shown by the double sided lines representing edges) to rendered versions: PDF document 320 and HTML page 340. The PDF document 320 is related to annotations 330. The HTML page 340 is related to image 1 350 and image 2 360.

For example, in response to selection of any content item in the graph 300, the linking system 122 follows all direct or indirect (e.g., reference) edges in the graph 300 to find the six content items and associates the six content items to one record being declared in a category of a file plan. Once the linked content items have been declared as a single record, the records management system 120 manages the lifecycle of the linked content items consistently.

Figure 4:
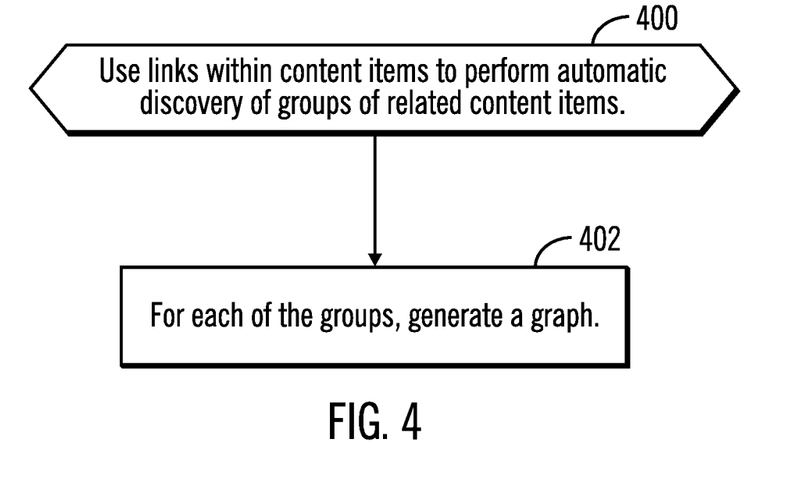
FIG. 4 illustrates, in a flowchart, operations for creating a graph in accordance with certain embodiments.

FIG. 4 illustrates, in a flowchart, operations for creating a graph in accordance with certain embodiments. Control begins at block 400 with the linking system 122 using links within content items to perform automatic discovery of groups of related content items. In block 402, the linking system 122 generates a graph for each of the groups of related content items.

In an embodiment, when a content item is selected to be declared as a record, the linking system 122 performs the operations of block 400 for automatic discovery, while taking into consideration any include/exclude link type. In an embodiment, in response to the user selecting a document to declare as record, the linking system 122 displays links, and the user may break a link (i.e., remove the link or the content item it points to to exclude that link or content item from the graph).

Figure 5:
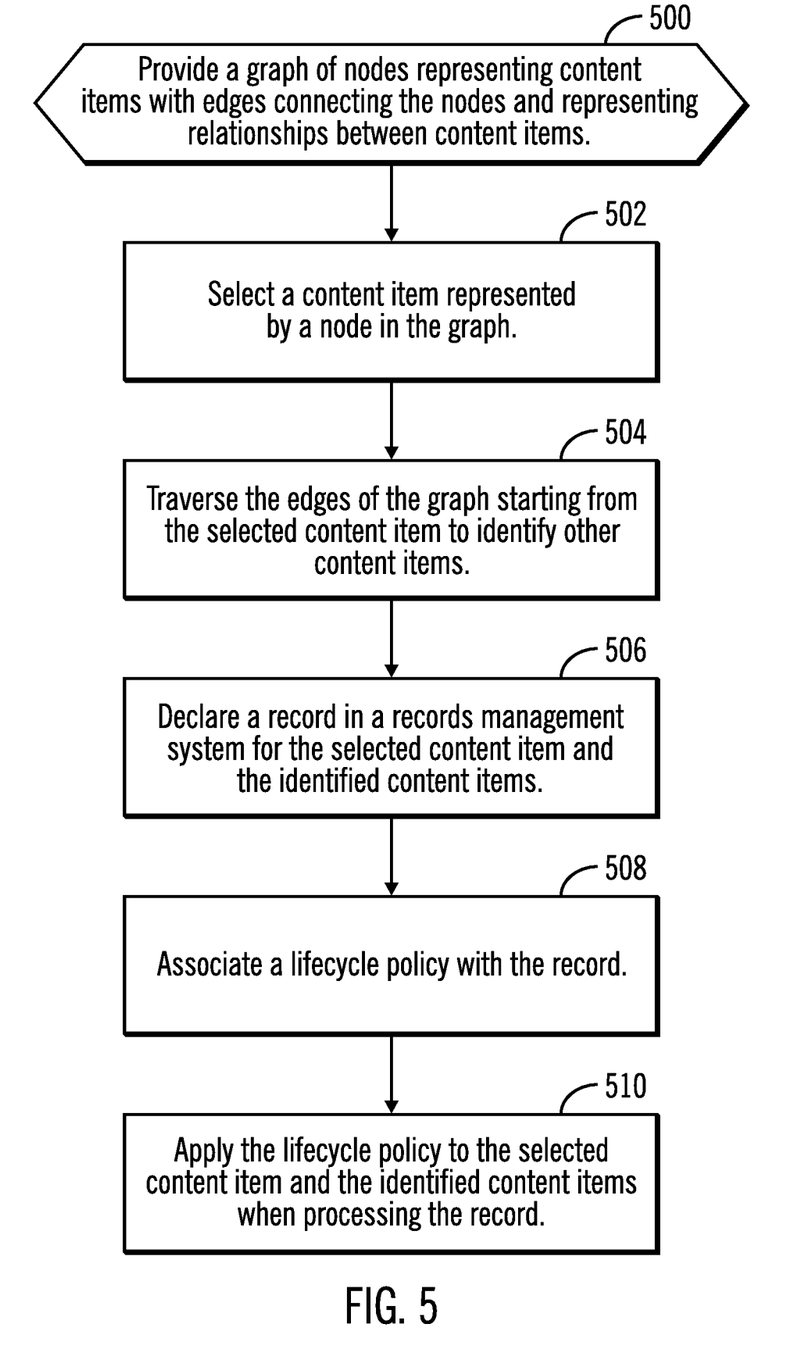
FIG. 5 illustrates, in a flowchart, operations for linking content items in accordance with certain embodiments.

FIG. 5 illustrates, in a flowchart, operations for linking content items in accordance with certain embodiments. Control begins at block 500 with the linking system 122 providing a graph of nodes representing content items with edges connecting the nodes and representing relationships between content items. In an embodiment, providing the graph includes displaying the graph on a computer screen.

In block 502, the linking system 122 selects a content item represented by a node in the graph. In an embodiment, the linking system 122 selects each content item and traverses the graph for that content item to obtain related content items. With other embodiments, a user may select the content item.

The operations of blocks 504-510 occurs in response to selection of the content item. In block 504, the linking system 122 traverses the edges of the graph starting from the selected content item to identify other content items (by identifying the nodes that are connected by edges in the graph). In block 506, the linking system 122 declares a record in a records management system for the selected content item and the identified content items. In block 508, the linking system 122 associates a lifecycle policy with the record. The lifecycle policy is associated with a category in which the record is stored in the file plan. In block 510, the linking system 122 applies the lifecycle policy to the selected content item and the identified content items when processing the record.

In an embodiment, the lifecycle policy applies to the record and cascades to all the associated content items. This provides an efficient technique for applying the lifecycle policy to multiple, related content items. So, if the record is deleted, all content items associated with the record are also deleted. If the record is put on hold, then all content items associated with the record are also put on hold. Thus, an operation on a record is also applied to the content items associated with that record.

Figure 6:
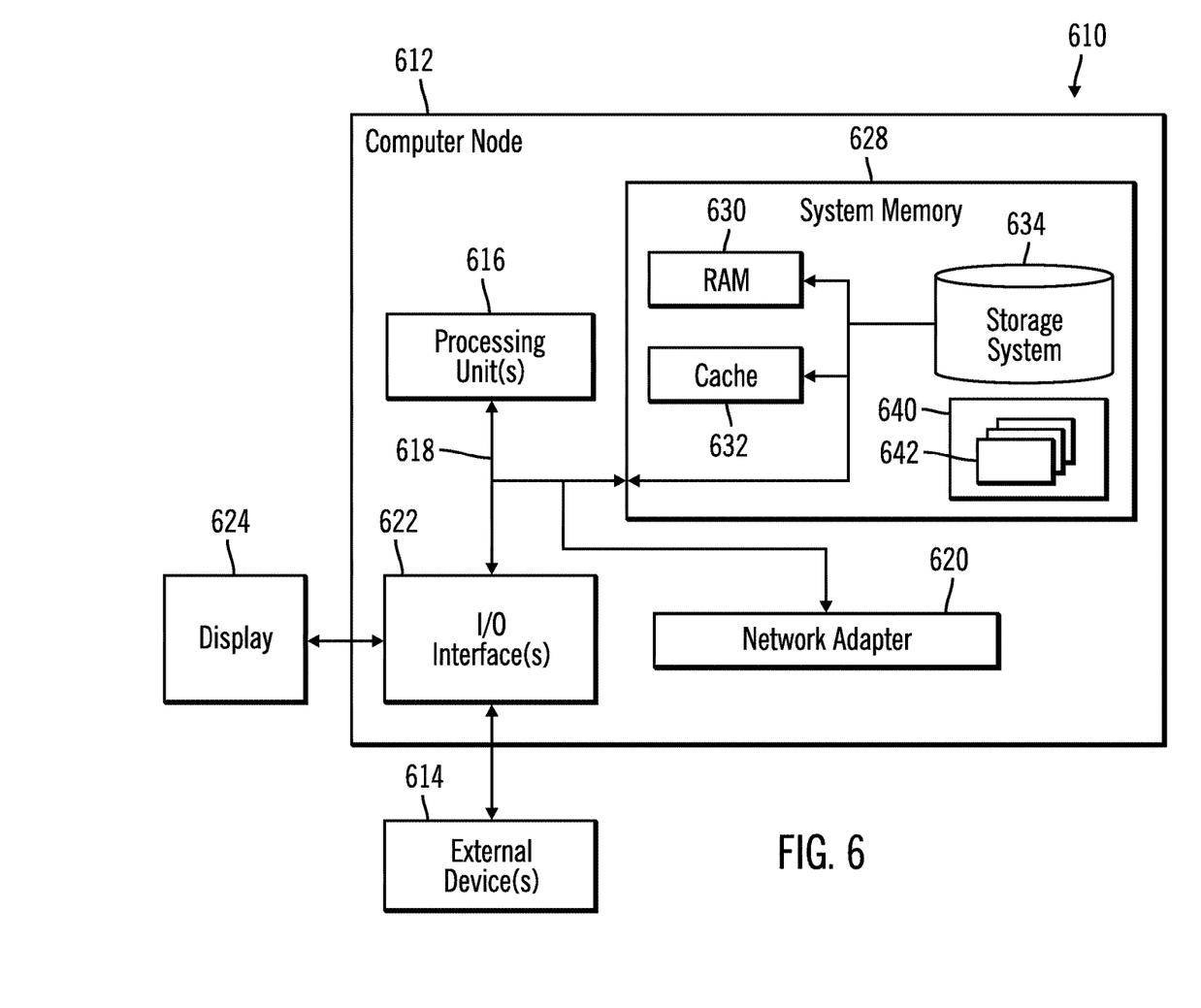
FIG. 6 illustrates a computing node in accordance with certain embodiments.

FIG. 6 illustrates a computing environment 610 in accordance with certain embodiments. In certain embodiments, the computing environment is a cloud computing environment. Referring to FIG. 6, computer node 612 is only one example of a suitable computing node and is not intended to suggest any limitation as to the scope of use or functionality of embodiments of the invention described herein. Regardless, computer node 612 is capable of being implemented and/or performing any of the functionality set forth hereinabove.

The computer node 612 may be a computer system, which is operational with numerous other general purpose or special purpose computing system environments or configurations. Examples of well-known computing systems, environments, and/or configurations that may be suitable for use with computer node 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 612 may be described in the general context of computer system executable instructions, such as program modules, being executed by a computer system. Generally, program modules may include routines, programs, objects, components, logic, data structures, and so on that perform particular tasks or implement particular abstract data types. Computer node 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer node 612 is shown in the form of a general-purpose computing device. The components of computer node 612 may include, but are not limited to, one or more processors or processing units 616, a system memory 628, and a bus 618 that couples various system components including system memory 628 to one or more processors or processing units 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 612 typically includes a variety of computer system readable media. Such media may be any available media that is accessible by computer node 612, and it includes both volatile and non-volatile media, removable and non-removable media.

System memory 628 can include computer system readable media in the form of volatile memory, such as random access memory (RAM) 630 and/or cache memory 632. Computer node 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, system memory 628 may include at least one program product having a set (e.g., at least one) of program modules that are configured to carry out the functions of embodiments of the invention.

Program/utility 640, having a set (at least one) of program modules 642, may be stored in system memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer node 612 may also communicate with one or more external devices 614 such as a keyboard, a pointing device, a display 624, etc.; one or more devices that enable a user to interact with computer node 612; and/or any devices (e.g., network card, modem, etc.) that enable computer node 612 to communicate with one or more other computing devices. Such communication can occur via Input/Output (I/O) interfaces 622. Still yet, computer node 612 can communicate with one or more networks such as a local area network (LAN), a general wide area network (WAN), and/or a public network (e.g., the Internet) via network adapter 620. As depicted, network adapter 620 communicates with the other components of computer node 612 via bus 618. It should be understood that although not shown, other hardware and/or software components could be used in conjunction with computer node 612. Examples, include, but are not limited to:

microcode, device drivers, redundant processing units, external disk drive arrays, RAID systems, tape drives, and data archival storage systems, etc.

In certain embodiments, the computing device 100 has the architecture of computer node 612. In certain embodiments, the computing device 100 is part of a cloud infrastructure. In certain alternative embodiments, the computing device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
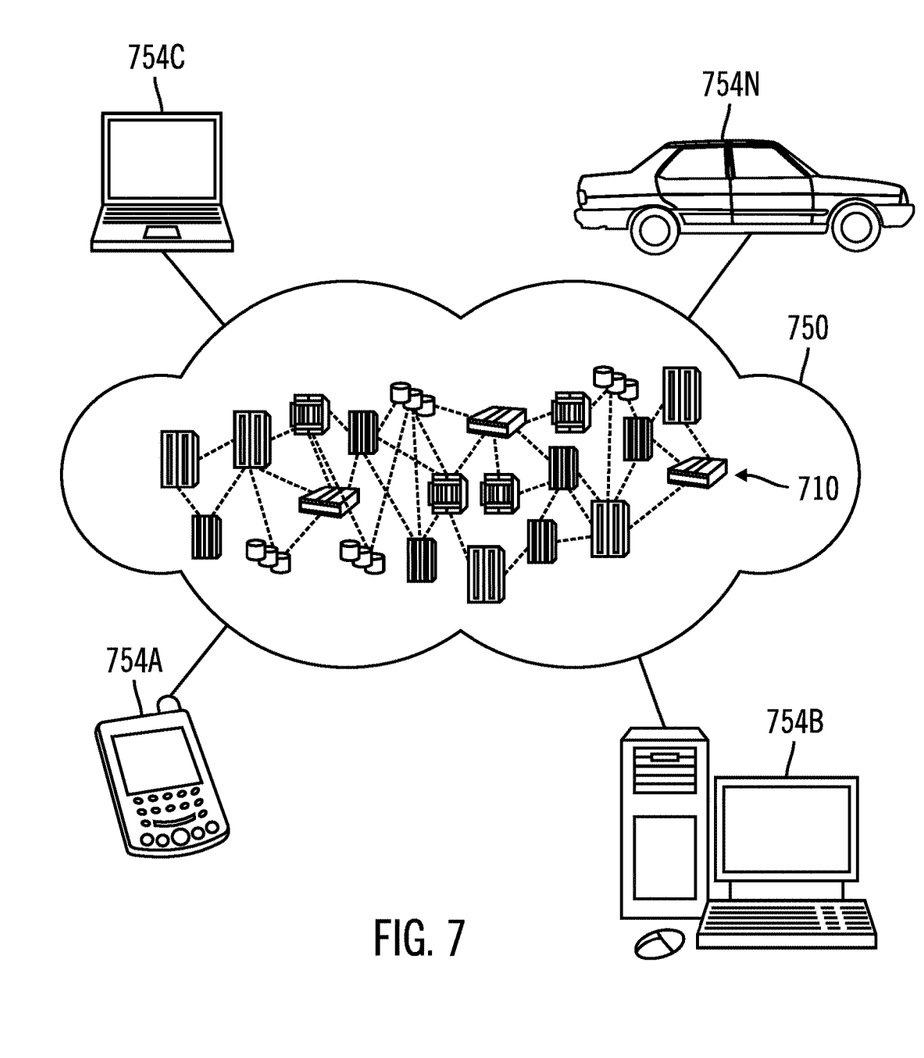
FIG. 7 illustrates a cloud computing environment in accordance with certain embodiments.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
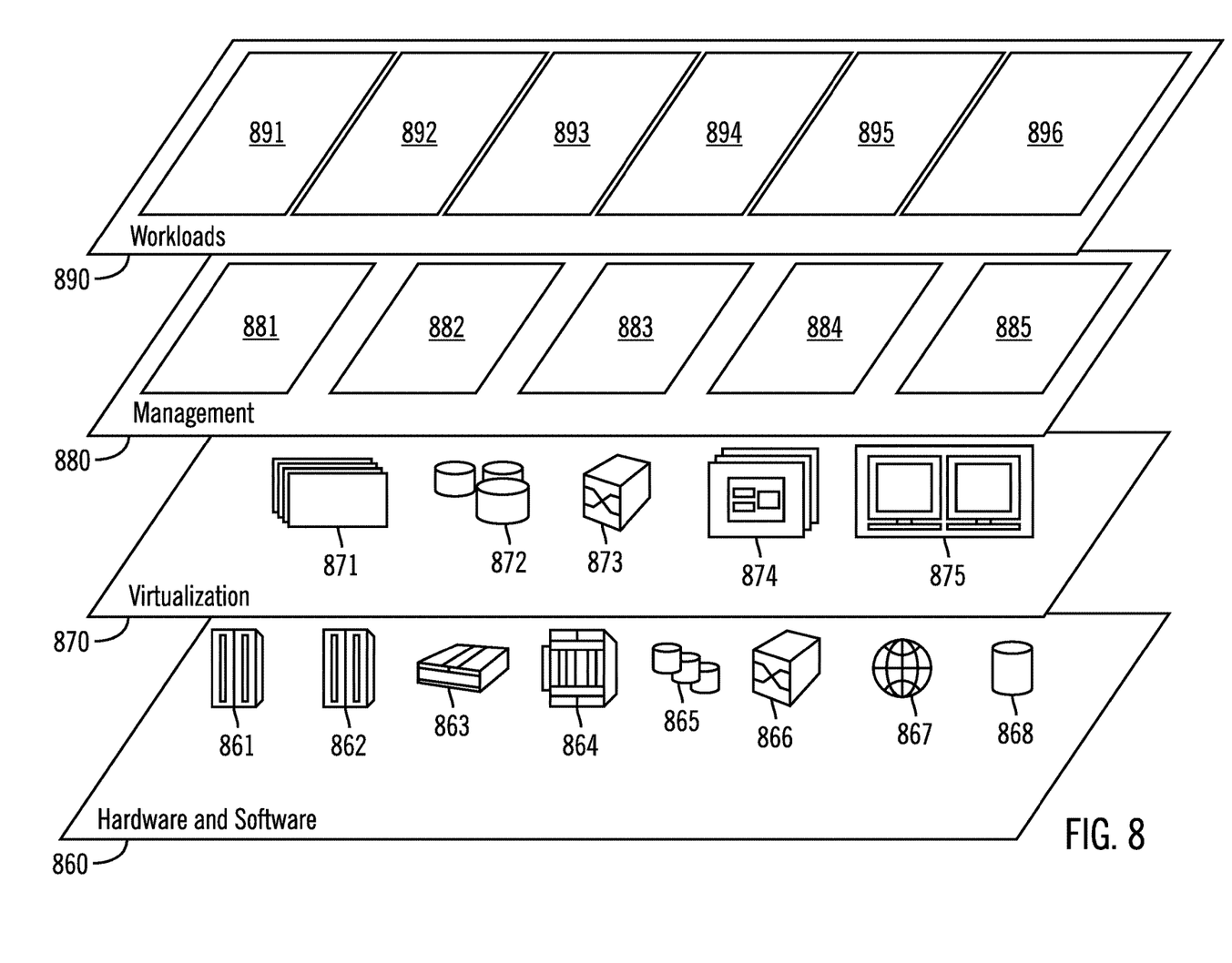
FIG. 8 illustrates abstraction model layers in accordance with certain embodiments.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and linked record declaration of related content items 896

Thus, in certain embodiments, software or a program, implementing linked record declaration of related content items in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising operations for:
   automatically following links within content items to identify related content items and relationships between the related content items;
   generating a graph of nodes representing the related content items with edges connecting the nodes and representing the relationships between the related content items;
   selecting a content item represented by a node in the graph of nodes; and
   in response to selection of the content item,
      automatically traversing the edges of the graph of nodes starting from the node for the selected content item to identify other content items;

automatically declaring a record in a category of a file plan of a records management system for the selected content item and the other content items, wherein a lifecycle policy is associated with the record;

in response to receiving selection of the record, displaying the graph of nodes; and in response to processing the record when the record is to be destroyed, automatically applying the lifecycle policy to delete the record, the selected content item, and the other content items.

2. The computer-implemented method of claim 1, wherein a type of link is excluded when following the links.

3. The computer-implemented method of claim 1, wherein the lifecycle policy specifies a retention date, and wherein the selected content item and the other content items are deleted after the retention date.

4. The computer-implemented method of claim 1, further comprising operations for:

in response to adding a new content item to the graph of nodes, determining that the new content item is linked to the selected content item and the other content items; and adding the new content item to the record.

5. The computer-implemented method of claim 1, wherein a Software as a Service (SaaS) is configured to perform the operations of the method.

6. A computer program product, the computer program product comprising a computer readable storage medium having program code embodied therewith, the program code executable by at least one processor to perform operations for:

automatically following links within content items to identify related content items and relationships between the related content items;

generating a graph of nodes representing the related content items with edges connecting the nodes and representing the relationships between the related content items;

selecting a content item represented by a node in the graph of nodes; and in response to selection of the content item, automatically traversing the edges of the graph of nodes starting from the node for the selected content item to identify other content items;

automatically declaring a record in a category of a file plan of a records management system for the selected content item and the other content items, wherein a lifecycle policy is associated with the record;

in response to receiving selection of the record, displaying the graph of nodes; and in response to processing the record when the record is to be destroyed, automatically applying the lifecycle policy to delete the record, the selected content item, and the other content items.

7. The computer program product of claim 6, wherein a type of link is excluded when following the links.

8. The computer program product of claim 6, wherein the lifecycle policy specifies a retention date, and wherein the selected content item and the other content items are deleted after the retention date.

9. The computer program product of claim 6, wherein the program code is executable by the at least one processor to perform further operations for:

in response to adding a new content item to the graph of nodes, determining that the new content item is linked to the selected content item and the other content items; and adding the new content item to the record.

10. The computer program product of claim 6, wherein a Software as a Service (SaaS) is configured to perform the operations of the computer program product.

11. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations comprising:

automatically following links within content items to identify related content items and relationships between the related content items;

generating a graph of nodes representing the related content items with edges connecting the nodes and representing the relationships between the related content items;

selecting a content item represented by a node in the graph of nodes; and in response to selection of the content item, automatically traversing the edges of the graph of nodes starting from the node for the selected content item to identify other content items;

automatically declaring a record in a category of a file plan of a records management system for the selected content item and the other content items, wherein a lifecycle policy is associated with the record;

in response to receiving selection of the record, displaying the graph of nodes; and in response to processing the record when the record is to be destroyed, automatically applying the lifecycle policy to delete the record, the selected content item, and the other content items.

12. The computer system of claim 11, wherein a type of link is excluded when following the links.

13. The computer system of claim 11, wherein the lifecycle policy specifies a retention date, and wherein the selected content item and the other content items are deleted after the retention date.

14. The computer system of claim 11, wherein the operations further comprise:

in response to adding a new content item to the graph of nodes, determining that the new content item is linked to the selected content item and the other content items; and adding the new content item to the record.

15. The computer system of claim 11, wherein a Software as a Service (SaaS) is configured to perform the operations of the computer system.

* * * * *